(12) United States Patent
Groholski (10) Patent No.: US 12,168,541 B2
(45) Date of Patent: Dec. 17, 2024

(54) LABEL HOLDER WITH MAGNETIC SUCTION PLATE

(71) Applicant: AMTIG ENGINEERING SOLUTIONS, LLC, Quincy, MI (US)

(72) Inventor: Steven Groholski, Quincy, MI (US)

(73) Assignee: AMTIG ENGINEERING SOLUTIONS, LLC, Quincy, MI (US)

(*) Notice: Subject to any disclaimer, the term of this patent is extended or adjusted under 35 U.S.C. 154(b) by 725 days.

(21) Appl. No.: 17/238,884

(22) Filed: Apr. 23, 2021

(65) Prior Publication Data

US 2022/0340323 A1 Oct. 27, 2022

(51) Int. Cl.
*B65C 9/18* (2006.01)
*B65C 3/08* (2006.01)
*B65G 21/20* (2006.01)
*B65G 47/91* (2006.01)
*B65H 19/18* (2006.01)

(52) U.S. Cl.
CPC ............ *B65C 9/18* (2013.01); *B65C 3/08* (2013.01); *B65C 9/1884* (2013.01); *B65G 47/91* (2013.01); *B65H 19/18* (2013.01); *B65G 21/2027* (2013.01)

(58) Field of Classification Search
CPC ..... G09F 3/02; G09F 2003/0273; B65C 9/18; B65C 3/08; B65C 9/1884; B65G 47/91; B65G 21/2036; B65G 21/2027; B65H 19/18

USPC ........................................................ 198/689.1
See application file for complete search history.

(56) References Cited

U.S. PATENT DOCUMENTS

| | | | | |
|---|---|---|---|---|
| 4,902,194 A | * | 2/1990 | Lane ................. | B65H 31/3072 198/689.1 |
| 8,863,939 B2 | * | 10/2014 | Panides ............. | G03G 15/657 198/689.1 |
| 2005/0217980 A1 | * | 10/2005 | Ripley ............... | B65C 35/08 198/689.1 |

FOREIGN PATENT DOCUMENTS

EP  3718913 A1 * 10/2020 ............... B65C 3/08

* cited by examiner

*Primary Examiner* — James R Bidwell
(74) *Attorney, Agent, or Firm* — FLYNN THIEL, P.C.

(57) ABSTRACT

A vacuum station comprising a main housing and a pair of arms extending from the main housing. The arms are configured to hold a roller. The main housing has a front face and a rear face, with the front face having a recess therein. An air path extends from the front face to the rear face. The vacuum station also includes a removable plate having a plurality of suction holes therethrough located within the recess in the front face of the main housing. The removable plate is removably connected to the main housing by magnets. A sheet of labels can be held to the removable plate by a suction force through the air path in the main housing and the suction holes in the removable plate.

21 Claims, 7 Drawing Sheets

LABEL HOLDER WITH MAGNETIC SUCTION PLATE

FIELD OF THE INVENTION

The present invention relates to bottling, and in particular to an improved label holder.

BACKGROUND OF THE INVENTION

Conveyor systems have been developed for quickly filling and capping a multitude of bottles in a very short period of time. The conveyor systems move empty and uncapped bottles along a line and/or along a periphery of a wheel and fill the bottles (with, for example, water, soda or any other liquid), cap the bottles while the bottles continuously move, and apply labels to the bottles.

SUMMARY OF THE INVENTION

The present invention, according to one aspect, is directed to a vacuum station comprising a main housing and a pair of arms extending from the main housing. The arms are configured to hold a roller. The main housing has a front face and a rear face, with the front face having a recess therein. An air path extends from the front face to the rear face. The vacuum station also includes a removable plate having a plurality of suction holes therethrough located within the recess in the front face of the main housing. The removable plate is removably connected to the main housing by magnets. A sheet of labels can be held to the removable plate by a suction force through the air path in the main housing and the suction holes in the removable plate.

Another aspect of the present invention is to provide a bottling label switching assembly comprising a switching housing, with the switching housing including a plurality of rolls and each of the rolls having a sheet of labels. The bottling label switching assembly further comprises a plurality of vacuum stations, with each of the vacuum stations corresponding to one of the plurality of rolls. Each of the vacuum stations comprises a main housing and a pair of arms extending from the main housing, with the arms configured to hold a roller. The main housing has a front face and a rear face, with the front face having a recess therein, and an air path extending from the front face to the rear face. Each of the vacuum stations also includes a removable plate having a plurality of suction holes therethrough located within the recess in the front face of the main housing, with the removable plate being removably connected to the main housing by magnets. The sheet of labels can be held to the removable plate by a suction force through the air path in the main housing and the suction holes in the removable plate.

Yet another aspect of the present invention is to provide a method of changing the suction area of a bottling label switching assembly. The method comprises providing a switching housing, with the switching housing including a plurality of rolls with each of the rolls having a sheet of labels. The method also includes providing a vacuum stations corresponding to one of the plurality of rolls and providing the vacuum station with a main housing and a pair of arm extending from the main housing, with the arms configured to hold a roller. The main housing has a front face and a rear face, with the front face having a recess therein, and an air path extending from the front face to the rear face. The method further includes providing a plurality of removable plates, with each of the removable plates having a plurality of suction holes therethrough. The method also includes removably positioning via magnets a first one of the removable plates within the recess in the front face of the main housing, removing the first one of the removable plates from the recess and replacing the first one of the removable plates with a second one of the removable plates within the recess by removably positioning via magnets a second one of the removable plates within the recess in the front face of the main housing, and holding the sheet of labels to the first one of the removable plates and then the second one of the removable plates by a suction force through the air path in the main housing and the suction holes in the first one of the removable plates and then the second one of the removable plates.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a prior art bottling label switching assembly. The prior art bottling label switching assembly 10 is used in conjunction with a bottling assembly line and in particular with the portion of a bottling assembly line wherein a label is attached to a bottle. An example of such bottling label switching assembly 10 is sold by Krones A. G. having a principal place of business located in Neutraubling, Germany under the name "Multireel C." The bottling label switching assembly 10 allows for a continuous sheet of labels to be supplied to the bottle assembly line, with the continuous sheet of labels being separated into individual labels as each label is applied to an individual bottle.

Figure 1:
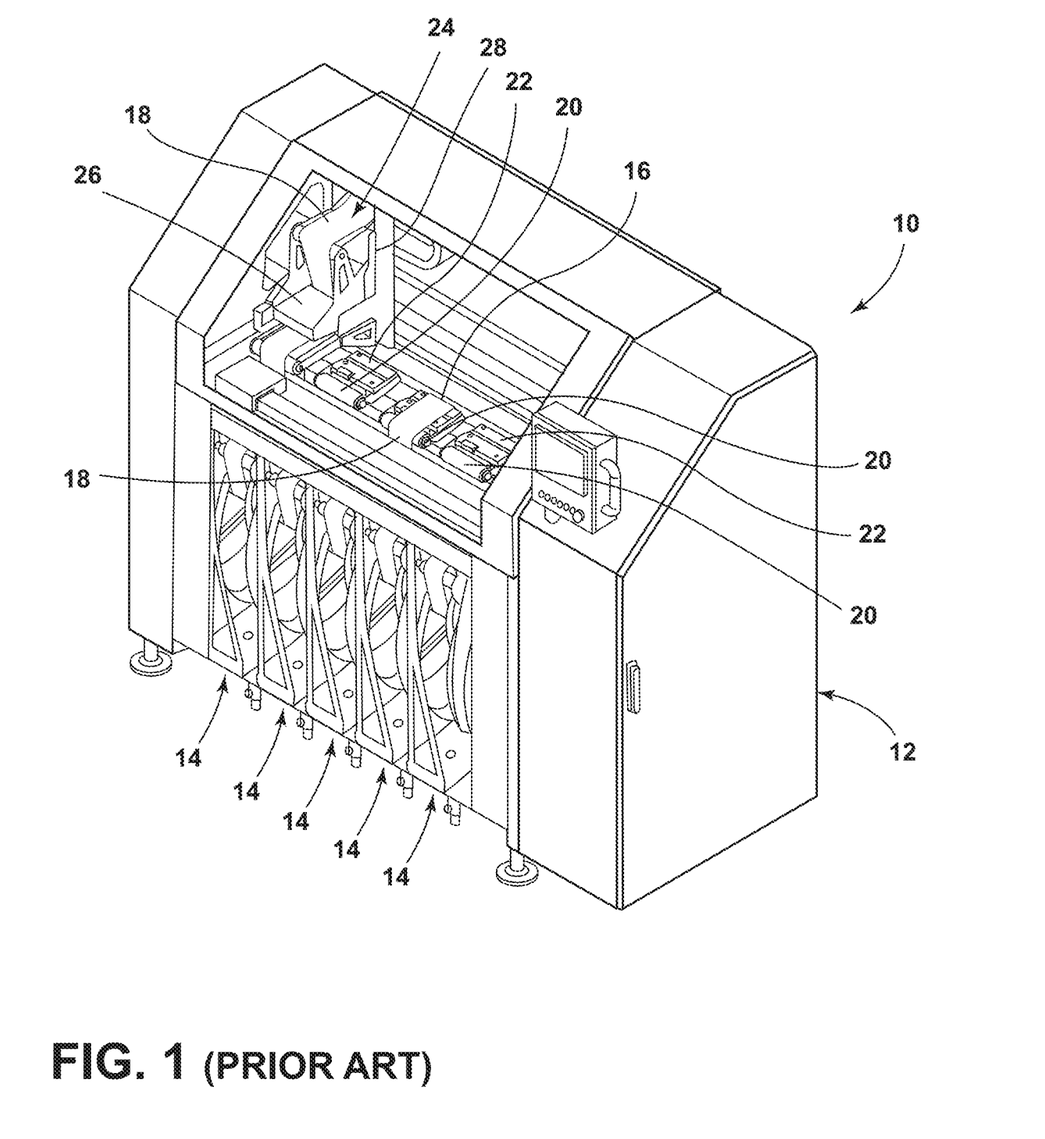
FIG. 1 is a perspective view of a prior art bottling label switching assembly.

The bottling label switching assembly 10 allows for a continuous feed of a sheet of labels to the bottling assembly line. The bottling label switching assembly 10 includes a housing 12 including a plurality of drawers 14 of label reels. Each drawer 14 has a large reel of a sheet of labels wrapped thereon. The drawers 14 can be pulled out of the housing 12 to allow for an empty reel to be replaced with a full reel of a sheet of labels before being slid back into the housing 12. Once the drawer 14 with the full reel of a sheet of labels is slid into the housing 12, a leading end 16 of a sheet of labels 18 is pulled over an alignment wheel 20 and placed on top of a vacuum station 22. The vacuum station 22 holds the leading end 16 of the sheet of labels 18 via suction.

During use, the sheet of labels from a particular drawer 14 are run over the alignment wheel 20 and picked up by a splicing assembly 24 comprising a cutting table 26 and a movable splicing station 28. The splicing assembly 24 supplies the sheet of labels to a label buffer (not shown), which in turn supplies the sheet of labels to the label application station of the bottle assembly line. When the reel within a particular drawer 14 is empty of the sheet of labels, the splicing assembly 24 quickly moves laterally to another vacuum station 22 and splices the leading end 16 of the sheet of labels at this new area onto the trailing end of the sheet of labels from the now empty reel of the adjacent drawer 14. The label buffer works to ensure that the sheet of labels can be supplied to the label application station of the bottle assembly line without any pause in the process.

Figure 2:
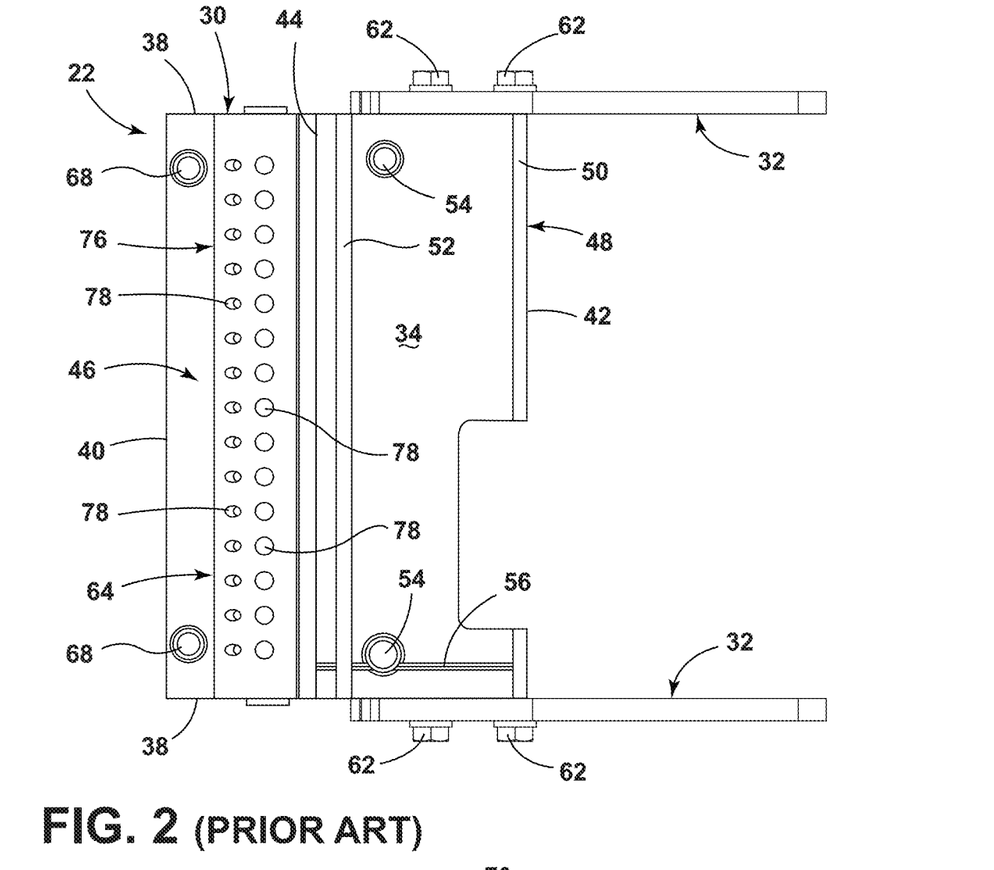
FIG. 2 is a top view of a prior art vacuum station used in the prior art bottling label switching assembly.
Figure 3:
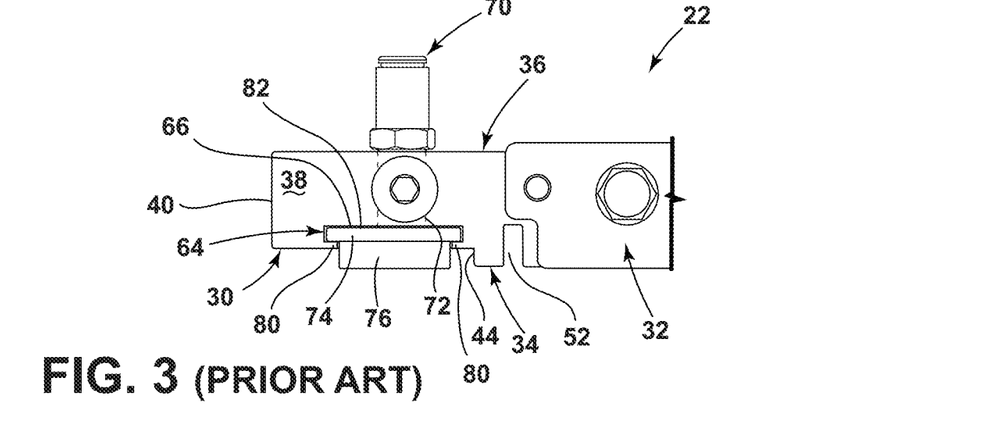
FIG. 3 is a top view of a prior art vacuum station used in the prior art bottling label switching assembly.

FIGS. 2 and 3 illustrate the prior art vacuum station 22 used to hold the leading end 16 of the sheet of labels 18 as outlined above. The vacuum station 22 of FIGS. 2 and 3 holds the alignment wheel 20, but the alignment wheel 20 is not shown in FIGS. 2 and 3. The vacuum station 22 includes a main housing 30 and a pair of roller arms 32. The main housing 30 is substantially block shaped and includes a front surface 34, a rear surface 36 substantially parallel to the front surface 34, a pair of substantially side surfaces 38, a top surface 40 and a bottom surface 42 substantially parallel to the top surface 40. The front surface 34 includes a step 44 that divides the front surface 34 between a suction area 46 and an arm connection area 48.

The arm connection area 48 of the prior art vacuum station 22 is used to hold the roller arms 32, which in turn hold one of the alignment wheels 20. The arm connection area 48 includes a bottom portion of the front surface 34, bottom portions of the side surfaces 38 and the bottom surface 42. As shown in FIG. 2, a beveled area 50 can be located at the junction of the front surface 34 and the bottom surface 42. A channel 52 parallel to the step 44 is located in the front surface 34 and extends to each side surface 38. A pair of counterbores 54 are located in the front surface 34.

The counterbores 54 are configured to accept fasteners therein for connecting the vacuum station 22 to the housing 12 of the bottling label switching assembly 10. The arm connection area 48 can also include a channel 56 into the front surface 34 parallel to one of the side surfaces 38, with the channel 56 passing through one of the counterbores 54 and extending between the step 44 and the beveled area 50. The arm connection area 48 can also include a large recess 58 into the bottom surface 42 as illustrated in FIG. 2. As shown in FIG. 2, the roller arms 32 are flush with the side surfaces 38 and connected to the arm connection area 48 by a pair of fasteners 62 that extend through the roller arms 32 and into the side surfaces 38.

The suction area 46 of the prior art vacuum station 22 is used to hold the leading end 16 of the sheet of labels 18 as outlined above. The suction area 46 includes a removable suction module 64 located in module slot 66 in the front surface 34. A pair of counterbores 68 are located between the module slot 66 and the top surface 40 of the suction area 46. The counterbores 68 are configured to accept fasteners therein for connecting the vacuum station 22 to the housing 12 of the bottling label switching assembly 10. As shown in FIG. 3, a suction line 70 is connected to the rear surface 36 of the main housing 30 behind the module slot 66. An internal hole 72 connects the suction line 70 with the removable suction module 64 to provide suction to the removable suction module 64 to hold the leading end 16 of the sheet of labels 18.

The prior art removable suction module 64 is replaceable and can be replaced when worn through use. The removable suction module 64 includes a perforated plate 74 having a holding panel 76 connected to the front of the perforated plate 74. As shown in FIG. 2, the holding panel 76 includes a plurality of holes 78 therethrough. The suction force from the suction line 70 extends through the internal hole 72, the perforated plate 74 and the holding panel 76 for holding the leading end 16 of the sheet of labels 18. As shown in FIG. 3, the module slot 66 is open to the side surfaces 38 and includes a pair of facing holding flanges 80 cantilevered inwardly over a large space 82 of the module slot 66. The removable suction module 64 is connected to the suction area 46 of the prior art vacuum station 22 by sliding the perforated plate 74 into the large space 82, with the holding flanges 80 preventing the perforated plate 74 from moving through the front surface 34. As shown in FIG. 2, the holding panel 76 extends through the front surface 34 between the holding flanges 80.

In the prior art, most of the prior art vacuum station 22 is made of metal. However, the holding panel 76 of the removable suction module 64 can be made of a softer material (e.g., rubber). During use of the prior art vacuum station 22, the holding panel 76 can degrade, thereby requiring replacement of the removable suction module 64. However, replacing the holding panel 76 of the prior art vacuum station 22 required the prior art vacuum station 22 to be removed from the prior art bottling label switching assembly 10. This often caused shutdown of the prior art bottling label switching assembly 10 and possible shutdown of the bottling assembly. Moreover, the prior art vacuum station 22 would sometimes have issues lining the leading end 16 of the sheet of labels 18 up straight for connection to a trailing end of another sheet of labels and did not always hold the leading end 16 of the sheet of labels 18 down completely flat (e.g., corners of the leading end 16 would roll up) to make a complete and proper connection to the trailing end of another sheet of labels, thereby not making a proper connection to the trailing end of another sheet of labels which could lead to a weak splice of the two sheets of labels and a break at the splice causing excessive downtime to correct. Since the bottling assemblies work continuously, any shutdown of the bottling assemblies can prevent thousands of bottles from being ready for shipping, costing the factories large amounts of money. Therefore, there is a desire to prevent and/or lessen the shutdown time of bottling assemblies. The vacuum station of the present invention as outlined below prevents and/or lessens the shutdown time of bottling assemblies.

The reference numeral 100 (FIGS. 4-6) generally designates the vacuum station of the present invention. Since the vacuum station 100 of the present invention is similar to the prior art vacuum station 22, similar parts appearing in FIGS. 2-3 and FIGS. 4-6 are represented by the same, corresponding reference number, except for the suffix "a" in the numerals of the latter. The vacuum station 100 has the same arm connection area 48 as the prior art vacuum station 22, but the suction area 46a of the vacuum station 100 is different than the prior art suction area 46.

Figure 4:
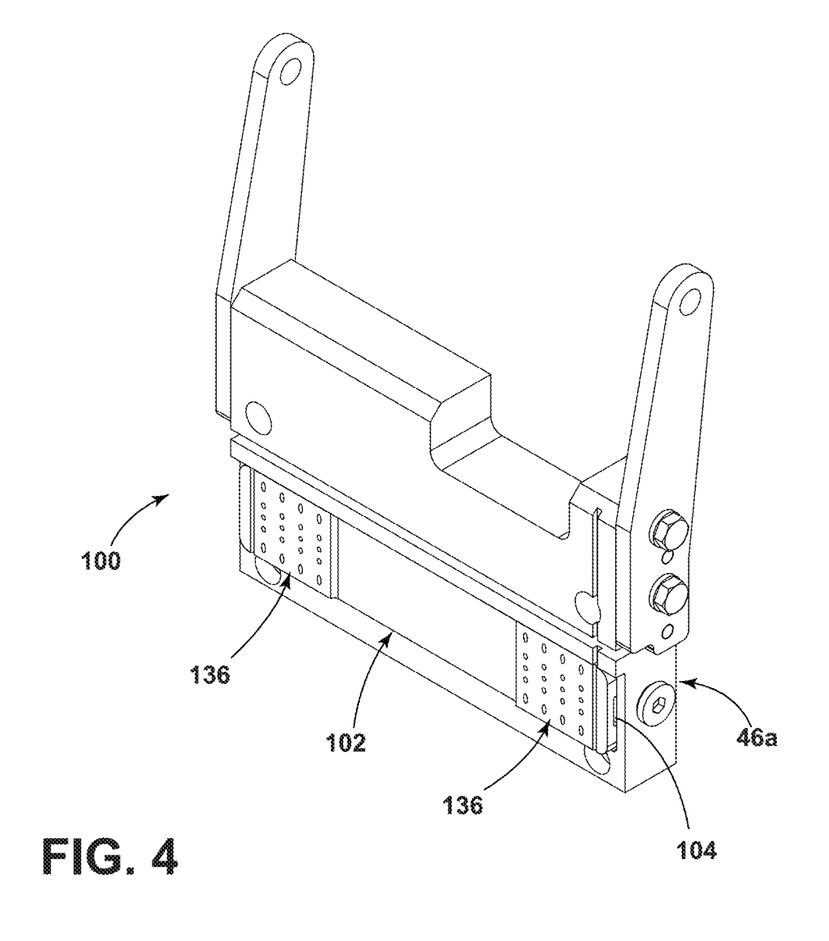
FIG. 4 is a perspective view of a vacuum station of an embodiment of the present invention.
Figure 5:
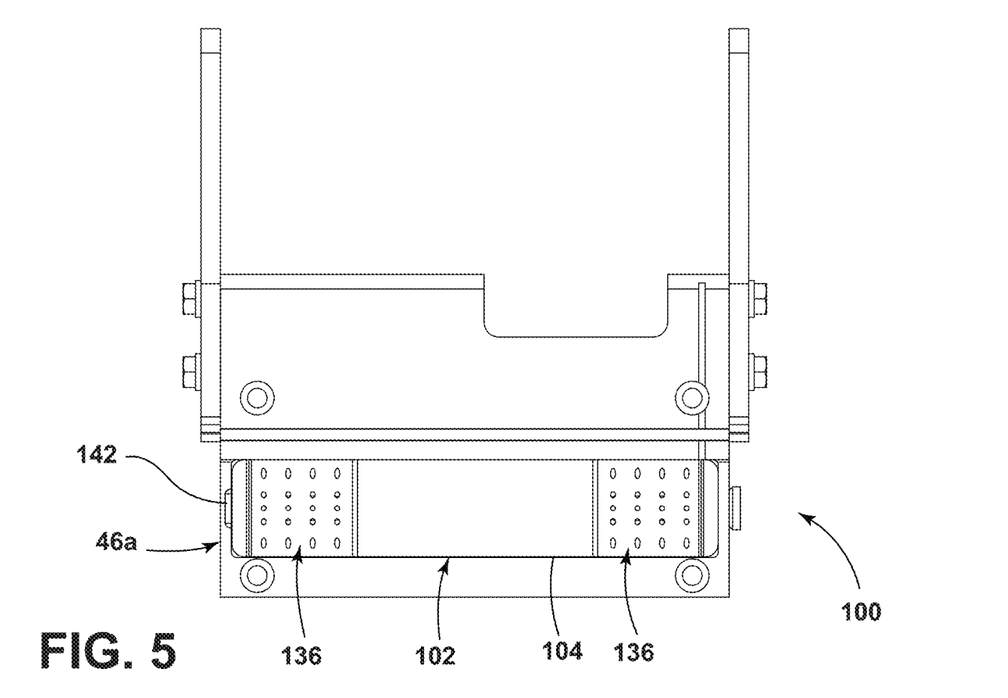
FIG. 5 is a front view of the vacuum station of an embodiment of the present invention.
Figure 6:
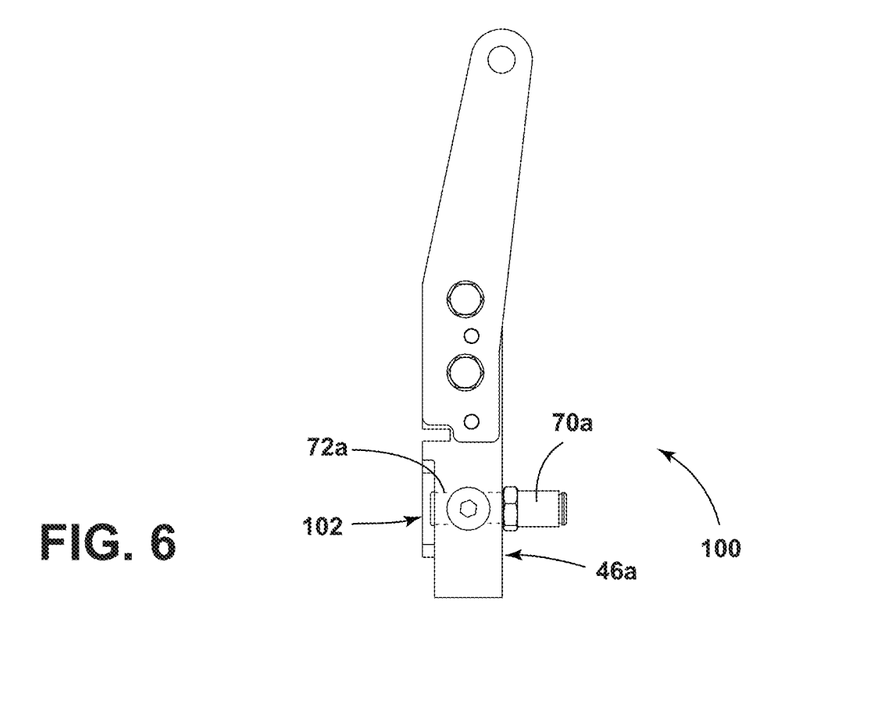
FIG. 6 is a side view of the vacuum station of an embodiment of the present invention.

In the illustrated embodiment, the suction area 46a of the vacuum station 100 includes a reusable suction plate 102 that is more durable than the prior art removable suction module 64 and also easier to replace/change than the prior art removable suction module 64. As illustrated in FIGS. 4-6, the suction area 46a includes a rectangular recess 104 having the reusable suction plate 102 therein.

Figure 7:
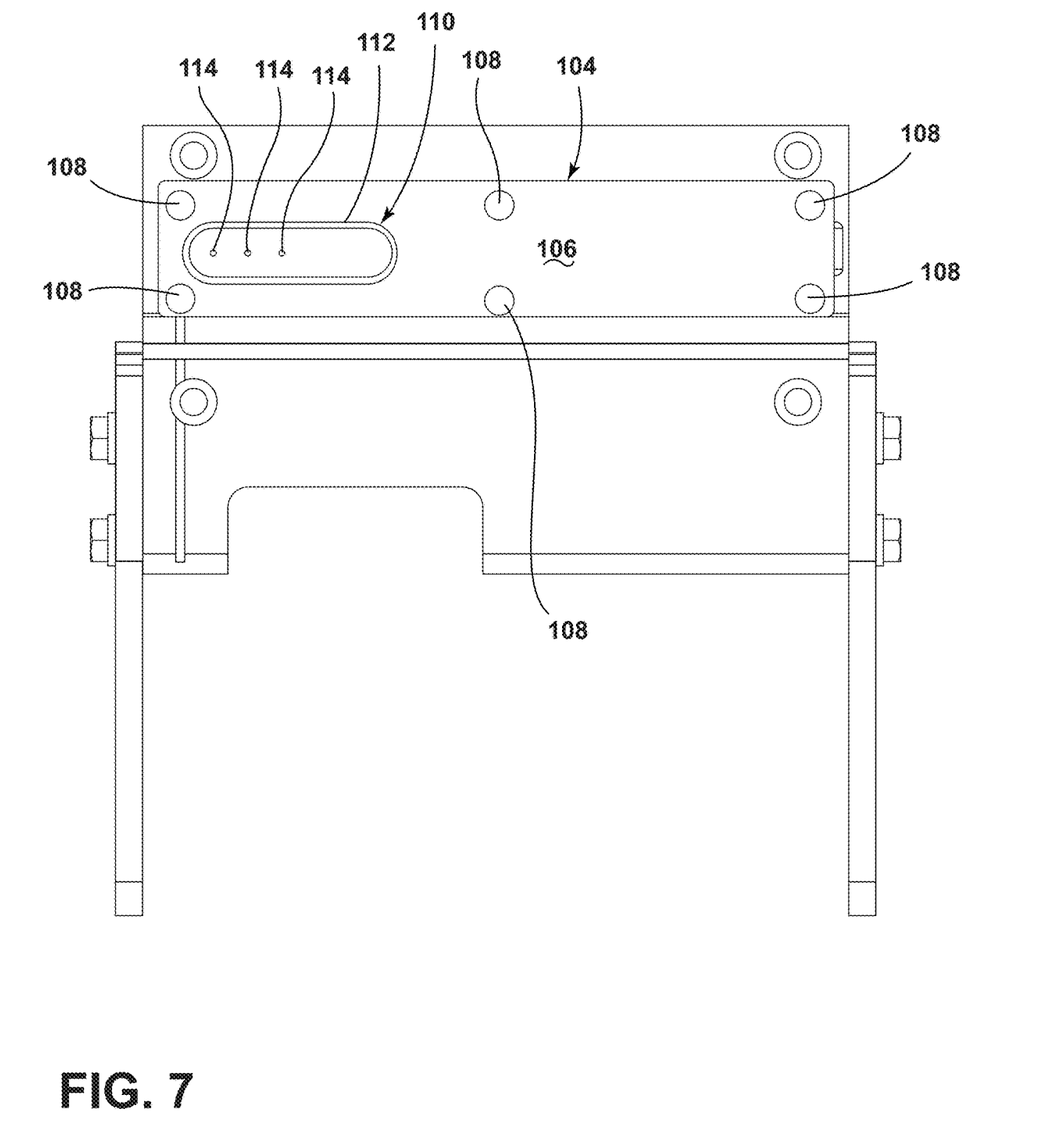
FIG. 7 is a front view of the vacuum station of an embodiment of the present invention with a reusable suction plate removed.
Figure 8:
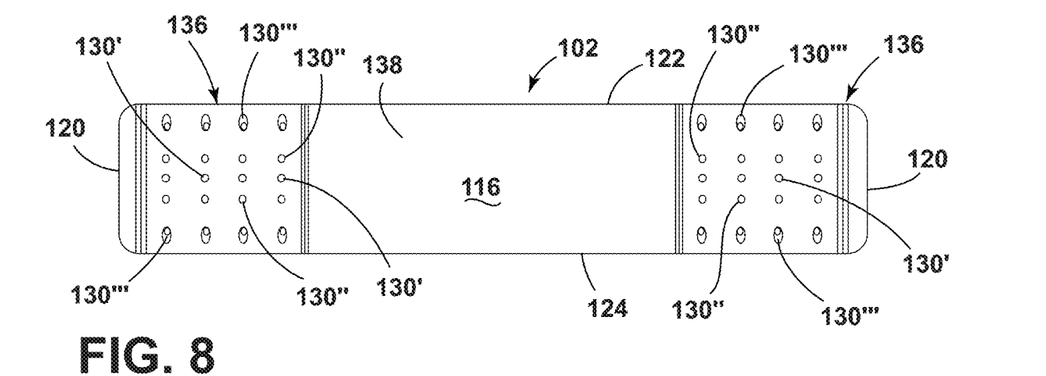
FIG. 8 is a front view of the reusable suction plate of an embodiment of the present invention.

FIG. 7 illustrates the vacuum station 100 with the reusable suction plate 102 removed. The illustrated rectangular recess 104 includes a recessed bottom surface 106 having a plurality of first magnets 108 flush with the recessed bottom surface 106. As discussed in more detail herein, the first magnets 108 hold the reusable suction plate 102 with the rectangular recess 104. As shown, the rectangular recess 104 includes six of the first magnets 108, one at each corner and two in the center at the top and bottom of the rectangular recess 104. However, it is contemplated that any number of the first magnets 108 and location thereof can be used as long as the first magnets 108 work with the reusable suction plate 102 to securely hold the reusable suction plate 102 within the rectangular recess 104.

One side of the illustrated rectangular recess 104 includes a suction area 110 for providing suction to the reusable suction plate 102. The suction area 110 has an oval seal ring 112 within the recessed bottom surface 106 and a plurality of openings 114 within the area defined by the oval seal ring 112. The openings 114 are connected to the internal hole 72a that connects the suction line 70a to the openings 114. Therefore, the openings 114 have a suction force. In the illustrated embodiments, there are three openings 114. However, it is contemplated that any number of openings 114 could be used.

In the illustrated example, the reusable suction plate 102 (FIGS. 8-11) rests within the rectangular recess 104 and is configured to hold the leading end 16 of the sheet of labels 18 in the same manner as the prior art removable suction module 64 outlined above. The reusable suction plate 102 comprises a substantially rectangular block and includes a front face 116, a rear face 118, side faces 120, a top face 122 and a bottom face 124. A periphery of the reusable suction plate 102 including the side faces 120, a top face 122 and a bottom face 124 substantially corresponds to the rectangular recess 104 of the vacuum station 100.

Figure 9:
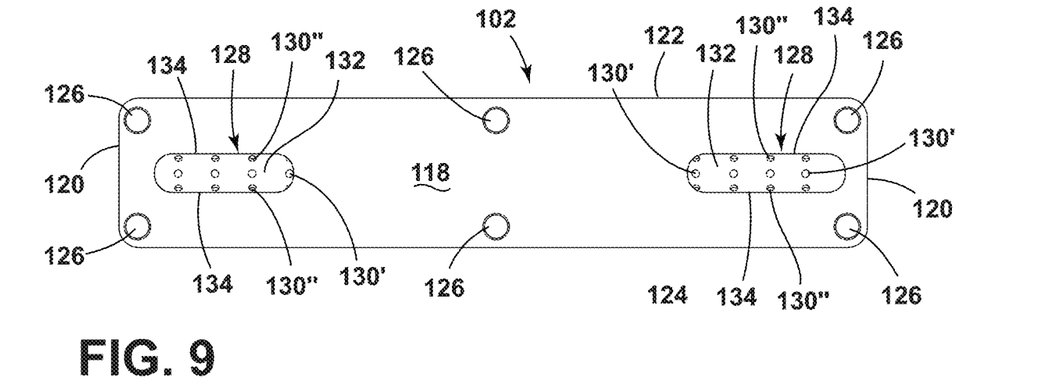
FIG. 9 is a rear view of the reusable suction plate of an embodiment of the present invention.
Figure 10:
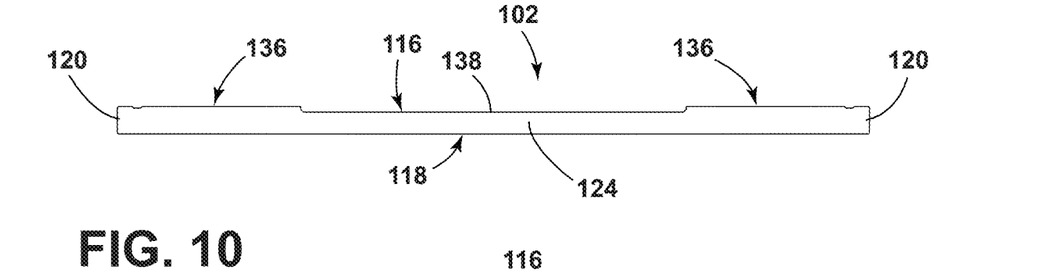
FIG. 10 is a side view of the reusable suction plate of an embodiment of the present invention.
Figure 11:
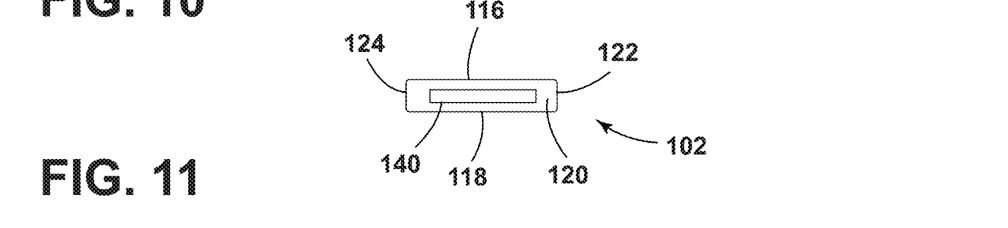
FIG. 11 is an end view of the reusable suction plate of an embodiment of the present invention.
Figure 12:
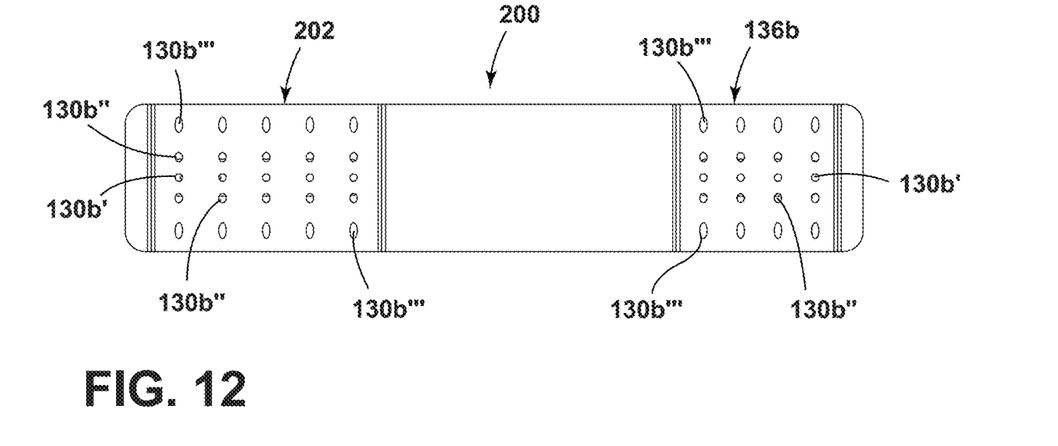
FIG. 12 is a front view of a second embodiment of the reusable suction plate of an embodiment of the present invention.
Figure 13:
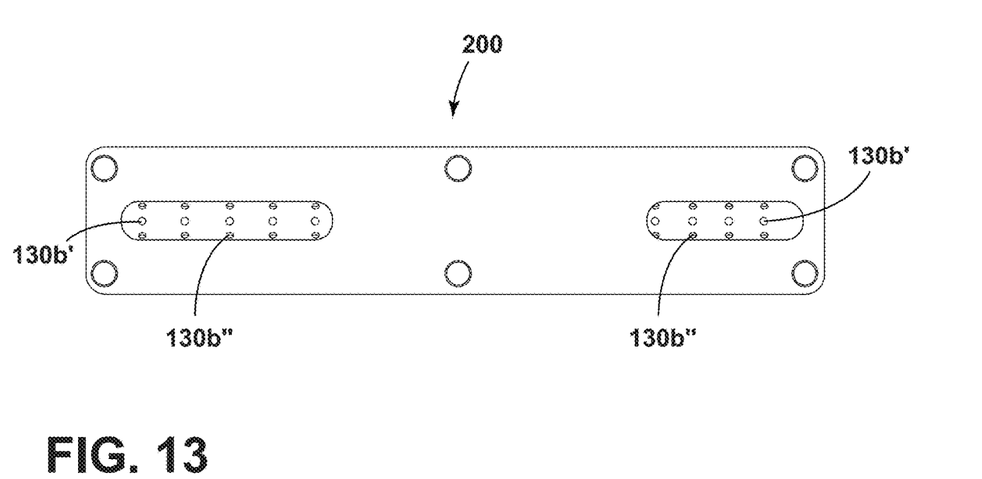
FIG. 13 is a rear view of the second embodiment of the reusable suction plate of an embodiment of the present invention.

The illustrated reusable suction plate 102 is configured to rest in the rectangular recess 104 of the vacuum station 100 in a plurality of positions. As shown in FIG. 9, the rear face 118 of the reusable suction plate 102 includes a plurality of second magnets 126 flush with the rear face 118. The second magnets 126 interact with the first magnets 108 in the rectangular recess 104 of the vacuum station 100 to hold the reusable suction plate 102 with the rectangular recess 104. As shown, the rear face 118 includes six of the second magnets 126 corresponding to the positions of the first magnets 108, one at each corner and two in the center at the top and bottom of the rear face 118. However, it is contemplated that any number of the second magnets 126 and location thereof can be used as long as the second magnets 126 work with the first magnets 108 to securely hold the reusable suction plate 102 within the rectangular recess 104. Notably, the position of the first magnets 108 and the second magnets 126 allow the reusable suction plate 102 to be rotated 180° and still have all of the first magnets 108 engage with the second magnets 126. While first magnets 108 and second magnets 126 are shown, it is contemplated that only the reusable suction plate 102 or the vacuum station 100 could include magnets and the other part could include metal securely held by the magnets, or each piece could include a combination of magnets and metal securely held by the magnets.

In the illustrated example, the reusable suction plate 102 is configured to cover the suction area 110 having the plurality of openings 114 within the area defined by the oval seal ring 112 of the vacuum station 100. As illustrated in FIG. 9, the rear face 118 of the reusable suction plate 102 includes a pair of oval recesses 128 that are smaller than the oval seal ring 112 such that the oval seal ring 112 covers the outside periphery of one of the oval recesses 128 when the reusable suction plate 102 is positioned within the rectangular recess 104. A plurality of suction holes 130', 130", 130''' extend from the oval recesses 128 through the front face 116 of the reusable suction plate 102. The suction holes 130', 130", 130''' can include straight holes 130' and slightly angled holes 130" that extend from a bottom surface 132 of the oval recesses 128 and extremely angled holes 130''' extending from side surfaces 134 of the oval recesses 128 such that each of the suction holes 130 opens into one of a pair of suction areas 136 separated by a channel 138 on the front face 116 of the reusable suction plate 102 to substantially cover the entire area of the suction areas 136 with equal distance between the holes.

The illustrated reusable suction plate 102 is configured to have multiple positions for holding the leading end 16 of the sheet of labels 18. FIGS. 4 and 5 illustrate the reusable suction plate 102 in a first position wherein the rightmost suction area 136 is configured to hold the leading end 16 of the sheet of labels 18. In the first position, the leftmost suction area 136 of FIGS. 4 and 5 does not hold the sheet of labels 18. In a second position, the reusable suction plate 102 is removed from the rectangular recess 104, rotated 180°, and replaced within the rectangular recess 104. Therefore, the previously leftmost suction area 136 now becomes the rightmost suction area 136 to hold the leading end 16 of the sheet of labels 18. To facilitate removal of the reusable suction plate 102 from the rectangular recess 104, the side faces 120 of the reusable suction plate 102 includes removal channels 140 and the suction area 46a of the vacuum station 100 includes an angled depression 142 (see FIG. 5) extending into the rectangular recess 104. A tool or a finger can be inserted through the angled depression 142 and into the removal channel 140 to lift the reusable suction plate 102 out of the rectangular recess 104.

During use of the vacuum station 100 of the present invention, the reusable suction plate 102 can have a vacuum force therethrough as outlined above to hold the leading end 16 of the sheet of labels 18 via suction as outlined above. Once one of the suction areas 136 of the reusable suction plate 102 gets worn, the reusable suction plate 102 can easily be rotated such that the side with a new/fresh suction area 136 is used to hold the leading end 16 of the sheet of labels 18. Once both suction areas 136 of the reusable suction plate 102 are worn, a new reusable suction plate 102 can be substituted for the worn reusable suction plate 102. Therefore, the bottling label switching assembly 10 can run easily and efficiently with little or no shutdown time.

The reference numeral 200 (FIGS. 12-13) generally designates another embodiment of the reusable suction plate of the present invention. Since the reusable suction plate 200 of the present second embodiment is similar to the first embodiment of the reusable suction plate 102, similar parts appearing in FIGS. 8-11 and FIGS. 12-13 are represented by the same, corresponding reference number, except for the suffix "b" in the numerals of the latter. The second embodiment of reusable suction plate 200 includes a suction area 136b identical to the suction area 136 of the first embodiment and a second suction area 202 that includes more holes 130b', 130b", and 130b'''. Therefore, depending on the rotated orientation of the reusable suction plate 200, either the suction area 136b or the suction area 202 can be active. Therefore, a single reusable suction plate 200 can be sold that is usable on multiple machines (in only one orientation), thereby reducing manufacturing costs. It is contemplated that more or less holes can be used for any suction area depending on the suction needs and/or the size of the sheet of labels.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A vacuum station comprising:
a main housing;
a pair of arms extending from the main housing, the arms configured to hold a roller;
the main housing having a front face and a rear face, with the front face having a recess therein, and an air path extending from the front face to the rear face; and
a removable plate having a plurality of suction holes therethrough located within the recess in the front face of the main housing, the removable plate being removably connected to the main housing by magnets;
wherein a sheet of labels can be held to the removable plate by a suction force through the air path in the main housing and the suction holes in the removable plate.

2. The vacuum station of claim 1, wherein:
both the removable plate and the recess in the main housing include magnets for holding the removable plate within the recess.

3. The vacuum station of claim 1, wherein:
the removable plate includes a pair of separated suction areas, each of the separated suction areas having the plurality of suction holes therethrough, only one of the separated suction areas being located over the air path such that the suction force extends through only one of the separated suction areas at a time.

4. The vacuum station of claim 3, wherein:
the removable plate is symmetrical about a vertical axis.

5. The vacuum station of claim 3, wherein:
the suction areas have different sizes and different numbers of suction holes.

6. The vacuum station of claim 3, wherein:
the removable plate has a first orientation wherein a first one of the separated suction areas is located over the air path and a second orientation wherein a second one of the separated suction areas is located over the air path, the first orientation of the removable plate being a 180° rotation of the removable plate relative to the second orientation.

7. The vacuum station of claim 1, wherein:
the main housing includes a seal ring within the recess, the seal ring having an opening to the air path located within the perimeter of the seal ring.

8. A bottling label switching assembly comprising:
a switching housing, the switching housing includes a plurality of rolls, each of the rolls having a sheet of labels; and
a plurality of vacuum stations, each of the vacuum stations corresponding to one of the plurality of rolls;
each of the vacuum stations comprises:
a main housing and a pair of arms extending from the main housing, with the arms configured to hold a roller, the main housing having a front face and a rear face, with the front face having a recess therein, and an air path extending from the front face to the rear face; and
a removable plate having a plurality of suction holes therethrough located within the recess in the front face of the main housing, the removable plate being removably connected to the main housing by magnets;
wherein the sheet of labels can be held to the removable plate by a suction force through the air path in the main housing and the suction holes in the removable plate.

9. The bottling label switching assembly of claim 8, wherein:
for each vacuum station, both the removable plate and the recess in the main housing include magnets for holding the removable plate within the recess.

10. The bottling label switching assembly of claim 8, wherein:
for each vacuum station:
the removable plate includes a pair of separated suction areas, each of the separated suction areas having the plurality of suction holes therethrough, only one of the separated suction areas being located over the air path such that the suction force extends through only one of the separated suction areas at a time.

11. The bottling label switching assembly of claim 10, wherein:
for each vacuum station, the removable plate is symmetrical about a vertical axis.

12. The bottling label switching assembly of claim 10, wherein:
for each vacuum station, the suction areas have different sizes and different numbers of suction holes.

13. The bottling label switching assembly of claim 10, wherein:
for each vacuum station:
the removable plate has a first orientation wherein a first one of the separated suction areas is located over the air path and a second orientation wherein a second one of the separated suction areas is located over the air path, the first orientation of the removable plate being a 180° rotation of the removable plate relative to the second orientation.

14. The bottling label switching assembly of claim 8, wherein:

for each vacuum station:

the main housing includes a seal ring within the recess, the seal ring having an opening to the air path located within the perimeter of the seal ring.

15. A method of changing a suction area of a bottling label switching assembly, the method comprising:

providing a switching housing, the switching housing including a plurality of rolls with each of the rolls having a sheet of labels; and providing a vacuum station corresponding to one of the plurality of rolls;

providing the vacuum station according to claim 1;

providing a secondary plate, the secondary plate having a plurality of suction holes therethrough;

removably positioning via magnets the removable plate within the recess in the front face of the main housing;

removing the removable plate from the recess and replacing the removable plate with the secondary plate within the recess by removably positioning via magnets the secondary plate within the recess in the front face of the main housing; and holding the sheet of labels to the removable plate and then the secondary plate by a suction force through the air path in the main housing and the suction holes in the removable plate and then the secondary plate.

16. The method of claim 15, wherein:

the removable plate, the secondary plate and the recess in the main housing include magnets for holding the removable plate and the secondary plate within the recess.

17. The method of claim 15, wherein:

each of the removable plate and the secondary plate includes a pair of separated suction areas, each of the separated suction areas having the plurality of suction holes therethrough, only one of the separated suction areas being located over the air path such that the suction force extends through only one of the separated suction areas at a time.

18. The method of claim 17, wherein:

at least one of the removable plate and the secondary plate is symmetrical about a vertical axis.

19. The method of claim 17, wherein:

at least one of the removable plate and the secondary plate includes the suction areas that have different sizes and different numbers of suction holes.

20. The method of claim 17, wherein:

at least one of the removable plate and the secondary plate has a first orientation wherein a first one of the separated suction areas is located over the air path and a second orientation wherein a second one of the separated suction areas is located over the air path, the first orientation of the removable plate being a 180° rotation of the removable plate relative to the second orientation.

21. The method of claim 15, wherein:

the main housing includes a seal ring within the recess, the seal ring having an opening to the air path located within the perimeter of the seal ring.

* * * * *